J. I. LINER.
MEANS FOR CALCULATING ELAPSED TIME VALUES.
APPLICATION FILED MAR. 4, 1914.

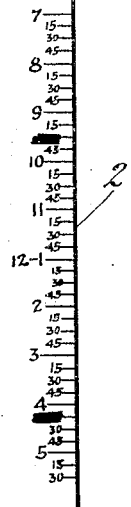

1,245,604.

Patented Nov. 6, 1917.

J. I. LINER.
MEANS FOR CALCULATING ELAPSED TIME VALUES.
APPLICATION FILED MAR. 4, 1914.
1,245,604. Patented Nov. 6, 1917.
4 SHEETS—SHEET 4.
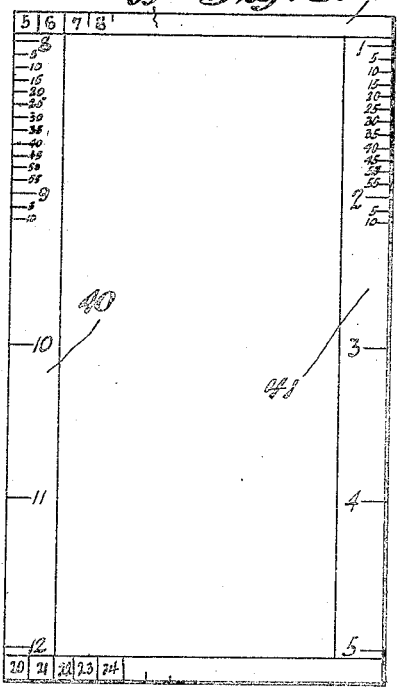
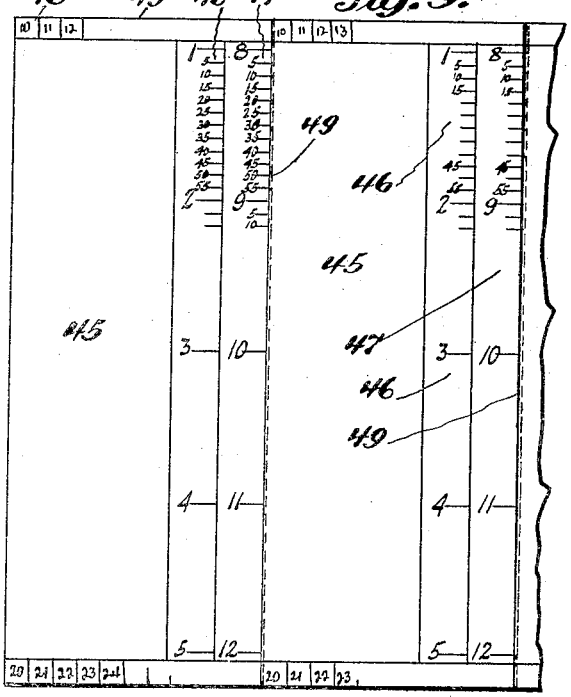
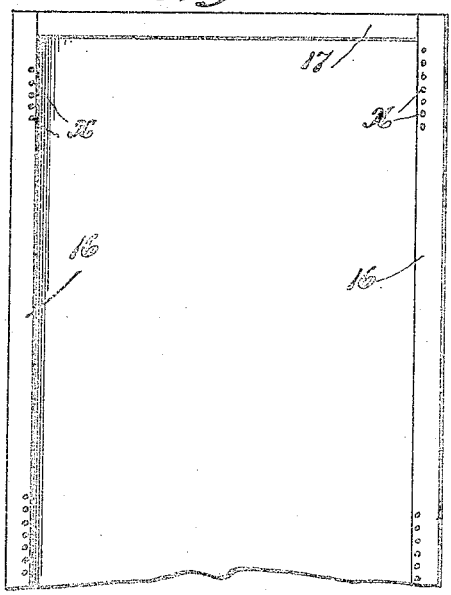
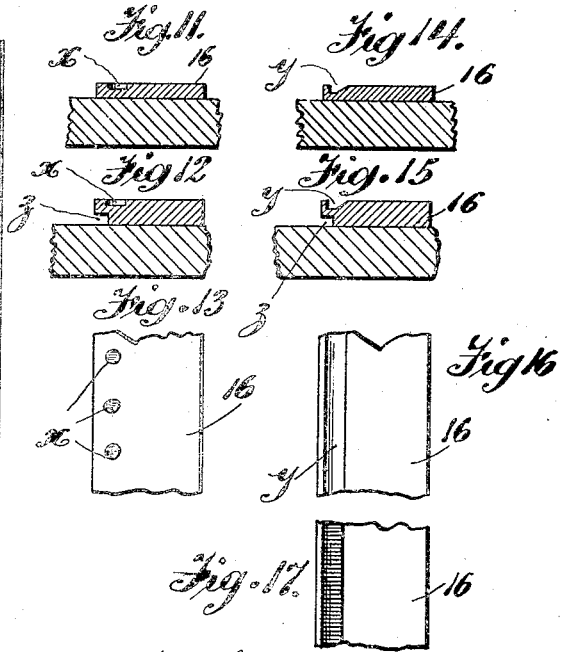
Witnesses:
Elsie Swenson
Ray J. Ernst
Joseph J. Liner Inventor
By his Attorneys Knight Bros.

UNITED STATES PATENT OFFICE.

JOSEPH I. LINER, OF NORTHVALE, NEW JERSEY, ASSIGNOR TO THE COSTIMETER COMPANY, OF DETROIT, MICHIGAN, A CORPORATION OF MICHIGAN.

MEANS FOR CALCULATING ELAPSED-TIME VALUES.

1,245,604. Specification of Letters Patent. Patented Nov. 6, 1917.

Application filed March 4, 1914. Serial No. 822,348.

*To all whom it may concern:*

Be it known that I, JOSEPH I. LINER, formerly a subject of the Emperor of Austria-Hungary, having declared my intention of becoming a citizen of the United States of America, residing at Northvale, county of Bergen, and State of New Jersey, have invented certain new and useful Improvements in Means for Calculating Elapsed-Time Values, of which the following is a full and clear specification.

The present invention is a development or improvement upon the means for calculating elapsed time values covered by Patent No. 1,069,964, dated August 12th, 1913, which involves the use of a time value table or schedule indicating time values at various rates, and a time check or ticket having elapsed time indicated upon it by the distance apart of suitable marks. The time value table or schedule is provided with a rib or projection to facilitate placing the marked check or ticket in proper position upon the schedule for quickly interpreting the markings upon the ticket. The main advantage in this system of calculating and recording elapsed time values lies in the fact that no mental effort is required, either of the workmen in marking the ticket or of the clerk in making the necessary deductions, the whole process being a mechanical one, requiring only the minimum attention in manipulating the marked tickets upon the table or schedule and copying the results clearly indicated in this operation.

The main object of the present invention is to improve the system of making time records upon checks or tickets and calculating the values of such records, so as to enlarge the adaptability of the system to more general use in commercial enterprises. In carrying out this object the time check or ticket for the use of the workman in recording his time of work has been improved, not only with a view to facilitating and simplifying the marking of the ticket by the workmen but also with a further view to facilitating the work of interpreting the money value of the marked ticket with reference to the time value table or schedule employed in connection with it. The time value table or schedule has also been improved to expand its adaptability and to facilitate accuracy and rapidity in its use in calculating the marked tickets.

The improved time check or ticket is provided in various forms with one or more time of day scales, arranged longitudinally upon the ticket so that the workman, in indicating his time upon a particular job is called upon to simply mark with a pencil the time of starting and the time of finishing his work. These time of day scales may be arranged with the noon hour or half hour eliminated, or in cases where there is no elimination of an idle time of the day, the full scale of hours from time of starting to time of finishing the day's work will be included upon the ticket. In some cases the time of day scale includes an added section of scale or an additional scale, upon which to mark work performed after the regular factory hours, for which, in many cases, an additional allowance per hour is made to the workman. This scale for overtime charges is arranged upon a time value measurement proportionately greater than the measurement of the regular time of day scale, depending upon the increased rate at which the overtime is charged. By reason of this arrangement of the overtime scale upon the increased time measurement over the regular scale, it will be understood that the full value of the regular and overtime indicated upon the marked ticket can be calculated as a whole upon the time value table or schedule which is arranged upon a time measurement scale equal to the divisions of the regular time of day scale. The time of day scale can be arranged upon a 5, 10 or 15 minute interval scale of time measurement (or any other convenient interval), and the scales can be placed upon the ticket in a single column or in cases where the interval is small, such as 5 minutes, and the ticket is relatively short, the scale can be divided up into two or more sections arranged in parallel columns. In addition to the time of day scale for the marking of the workman, each ticket is preferably provided with a series of numerals or indices indicating rates per hour, or per week, or per month, at which the several workmen of a particular factory are engaged. These rate numerals are extended transversely of the time check or ticket at one or both ends and in some cases in a series of transverse columns. The transverse spacing of the rate numerals corresponds with the transverse spacing of the columns of scales in the time value table or schedule hereinafter referred to, it being understood that the arrangement of these rate numerals must correspond with the progressive scales of the time value table or schedule, so that when the ticket is placed in position upon the table or schedule the rate numerals will properly aline with the respective progressive value scales of the table or schedule. The ticket may be formed as a single leaf ticket or in the form of a coupon ticket, in which latter case the individual coupons are in effect tickets of reduced size having the essential characteristics of the full size tickets.

For interpreting the various markings upon tickets of the character above referred to, an improved time value table or schedule has been arranged. The essential characteristics of the improved table or schedule are the arrangement in the particular column formation of a plurality of progressive value scales, each scale progressing upon a different rate and the progressive numerals of the several scales being in transverse parallel lines. The progressive positions of the value scale numerals are arranged upon a time value scale of measurement the same as the scale markings of the time of day scale upon the time check or ticket and the spacing between the columns of scale numerals is the same as the spacing between the rate numerals of the transverse lines of rate numerals upon the tickets. In the forms of tickets in which more than one transverse line of rate numerals is employed at a single end of the ticket, it will be understood that each line of rate numerals refers to a separate and distinct interpreting table or schedule, it being necessary in such cases that the time value table or schedule shall have as many sections of tables as the ticket has lines of rate numerals. In those cases in which the time check or ticket has a line of rate numerals arranged transversely at both ends, it is necessary, for interpreting all possible markings upon such a ticket, to have two longitudinally arranged time value tables or schedules of progressive value scales, with the corresponding time intervals of said schedules separated by a space equal to one time interval longer than the length of the ticket. This feature will be more clearly understood in connection with the drawings. The tickets are in some cases provided with fractional rate numerals for use with which the time value table or schedule is provided with proper progressive scales for interpretation. Each time value table or schedule is provided along one longitudinal edge of the series of columns of numerals, with a gaging flange or strip to facilitate the positioning of a time check or ticket transversely thereon. The table or schedule is also provided with a transverse gaging flange or strip adjacent to one end of the series of columns of scale numerals to facilitate the positioning of the time check or ticket longitudinally thereon. The longitudinal gaging flange or strip is preferably formed with a depression or series of depressions to facilitate the placing of a pencil or other pointed instrument in desired position with reference to the marked time of day scale upon the check or ticket, while the ticket is being interpreted. In the operation of interpreting a ticket marking, the operator places the marked ticket face up upon the proper time value table or schedule with one longitudinal edge of the ticket in engagement with the longitudinal gaging flange or strip and a transverse edge in engagement with the transverse gaging flange or strip of the schedule. The operator then places his pencil or other pointed instrument in the depression of the longitudinal gaging flange or strip in transverse alinement with the marked finishing time of the ticket held in gaged position. Holding the pencil in this position, the operator slides the ticket downwardly using the gage flange or strip as a guide, until the marked time of starting upon the ticket is opposite the point of the pencil or other instrument. This movement of the ticket will expose portion of the time value table or schedule above and below the ticket and cover up a portion of the time value table or schedule equal to the length of the ticket. The rate of the particular workman who has performed the work indicated by the ticket having been marked, it is only necessary for the operator to read from the proper scale indicated by the column above or below the checked rate numerals. This amount is copied upon the card to complete the record.

The above exemplifies the main characteristics of the present invention, which is capable of many modifications making it applicable to various systems of manufactures and business in vogue today. In order that the invention may be fully understood it will first be described with reference to the accompanying drawings and the novelty afterward particularly pointed out in the annexed claims.

In said drawings,

Figures 1, 2 and 3 are face views of workmen's time checks or tickets embodying the essential characteristics of the present invention and having markings to indicate work performed. These several tickets are essentially the same, excepting that those shown in Figs. 2 and 3 have included two forms of overtime time of day scales.

Fig. 4 is a face view of a time value table or schedule having in place thereon in starting position, a marked time check or ticket of the form shown in Fig. 2.

Fig. 5 is a similar view showing the second position of the check or ticket upon the table or schedule in interpreting the ticket markings.

Fig. 6 is a face view of a modified form of ticket showing three rows of rate numerals at the top and fractional rate numerals at the bottom.

Fig. 7 is a face view of a time value table or schedule formed of three sections for use with a ticket such as shown in Fig. 6, having three transverse series of rate numerals.

Fig. 8 is a face view of a further modified form of time check or ticket having a time of day scale of 5 minute intervals shown in two sections upon the opposite longitudinal edges of the ticket.

Fig. 9 is a similar view showing a coupon form of ticket with a divided 5 minute interval time of day scale.

Fig. 10 is a detail face view of part of a modified form of table or schedule for use with the form of ticket shown in Fig. 8.

Figs. 11, 12, 13, 14, 15, 16 and 17 are detail views illustrating several modified forms of the longitudinal guide flange or rib of the time value table or schedule.

The time check or ticket shown in Fig. 1 comprises an oblong sheet of paper or cardboard 1, having various characters printed upon its face, including the time of day scale 2, arranged along the right hand longitudinal edge of the ticket, the series of rate numerals 3 arranged along the upper edge of the ticket, and the series of rate numerals 4 arranged along the lower edge of the ticket. The series of rate numerals 3 and 4 extend transversely of the ticket at right angles to the longitudinal time of day scale 2. The remaining face of the ticket may be provided with any suitable spaces for the entry of items such as shown, namely, the job number, the department, the name of the workman, etc. The time of day scale 2 is arranged on a 15 minute interval and the spacing of the intervals of this scale are upon a predetermined time measurement scale so that the distance or space between any two marked points on this scale will indicate upon the given time measurement the hours and fractions of hours that have been spent upon a particular piece of work. This time measurement scale is the same as the spacing of the numerals in the time value scale of the table or schedule hereinafter referred to in interpreting the ticket markings. The series of rate numerals 3 and 4 are spaced transversely upon the time check or ticket to correspond with the column spacing of the value scales in the table or schedule hereinafter referred to. The ticket shown in Fig. 1 is what is known as an operation ticket, designed for use in factories where the time on each particular job is kept on a separate ticket.

The ticket 5 shown in Fig. 2 is a slight modification of that shown in Fig. 1, the series of numerals 6 and 7 at the opposite ends of the ticket being substantially the same, while the time of day scale 8, includes at its lower end an overtime scale $8^a$ arranged on an expanded time measurement of 50% increase over the ordinary time of day scale, so that an hour on the overtime scale will equal in time measurement in calculating the cost of the workman, to one hour and a half of the ordinary time scale. Such an overtime scale is employed in factories where overtime is paid for at 50% increase over the regular rate per hour. This ticket in Fig. 5 is arranged as a daily ticket upon which the time record for a number of jobs can be conveniently kept.

In Fig. 3 I have shown a further modified form of ticket 9 having a time of day scale 10 at one edge and an overtime scale 11 arranged in a parallel column upon a 50% increase basis. The rate numerals 12 and 13 in this form of ticket are practically the same as shown in Figs. 1 and 2. The ticket markings upon the tickets shown will be hereinafter referred to. The tickets of Figs. 1, 2 and 3 give weekly rates.

Referring to Figs. 4 and 5, 15 represents a suitable frame in which is mounted two time value tables or schedules of value scales arranged longitudinally in the frame with the zero position of one schedule spaced from the zero position of the other schedule a distance equal to one time interval, more than the length of the time check or ticket which is designed to be interpreted upon said double table or schedule. In Figs. 4 and 5 a time check or ticket is shown in operative position upon the table or schedule, so that only parts of the value scales are visible, but sufficiently shown to illustrate the principle of the invention. Along the right hand longitudinal edge of the frame 15 is mounted a gaging flange or strip 16 having adjacent to its inner edge a series of small depressions $16^c$ to receive and position the point of a pencil or other instrument used in calculating the time marking upon tickets. Across the top of the frame 15 is a transverse gaging strip or flange 17.

The ticket shown in Figs. 4 and 5 upon the table or schedule is the same as illustrated in Fig. 2 of the drawings, excepting the tickets are differently marked as to time spent by the workman upon several jobs. In Figs 4 and 5 the marking of the ticket indicates that the workman started upon his first job at 7 o'clock and worked until 9:45, at which time he took up another job and worked until 2:30 (the noon hour being eliminated). Then he started a third job and worked until 4:15 and from that time he worked on a fourth job until 6:30, the time from 5 to 6:30 being after regular factory hours and being therefore charged as time and a half. In interpreting this ticket, it is placed upon the time value table or schedule shown in Fig. 4, with the marked longitudinal scale edge in engagement with the gage flange 16 and its upper edge in engagement with the transverse gage flange 17. The operator places his pencil upon the gage 16 in transverse alinement with the finishing time of the first job which is 9:45 and slides the ticket downwardly until the marked starting time (7 o'clock) comes opposite the pencil. He then reads the numerals directly above the upper edge of the card in the column alined with the marked rate 12 of the ticket and that is the amount of the workman's time at the indicated weekly rate for the first job. This amount is copied in the proper space opposite the job for which this time was expended. To get the time for the second job the operator performs the same operation over again, first moving the card back to starting position as shown in Fig. 4, then placing his pencil upon the gage flange 16 opposite the finishing time for the second job which is 2:30 and holding his pencil in that position, sliding the card down in engagement with flange 16 until the time of starting of the second job (9:45) is opposite the pencil point. The amount in the value scale above the rate numeral 12 is again read, and this will be the cost of the workman's time for the second job at the rate given. The positions of the ticket in performing the operation of calculating the cost of the workman's time for the second job is illustrated in Figs. 4 and 5 of the drawings; Fig. 4 showing the initial position of the ticket upon the schedule with the point at which the pencil is held upon gage flange 16 indicated at x, and Fig. 5 showing the finishing position in which the ticket has been drawn down to cause the starting time 9:45 of the second job to register with the pencil point at x.

In Figs. 1, 2, 4 and 5 the time check or ticket has a second rate numeral indicated by a dotted circle on the lower edge of the ticket. If the ticket had been marked with this weekly rate the calculations could have been accomplished in the same manner by manipulating the ticket as explained, and reading the result on the scale just below the lower edge of the ticket in the column of figures indicated by the marked rate numeral.

In computing the cost of the workman for the last job indicated upon the ticket shown in Figs. 2, 4 and 5, it will be observed that part of the time has been marked off upon the overtime section of the time of day scale. This overtime section of the scale is arranged upon an increased time interval, depending upon the rate of increase for overtime over regular time that the particular factory has agreed to pay its workmen. In the particular illustration given the overtime section of the scale shows a 50% increase in pay for overtime so that an hour on this overtime scale will be equivalent to an hour and a half on the regular hourly scale. By this arrangement it will be understood that overtime is automatically provided for in the calculations of the time values by the manipulation of the marked ticket as above explained, the marking of an hour of overtime measuring up in the calculation to the equivalent of an hour and a half of regular factory time. Thus in the example given, the calculation of the time spent on the last job marked on the ticket, shown in Figs. 4 and 5, in which the job was started at 4:15 and completed at 6:30, the result given is that two hours and 15 minutes were expended on the job, of which 45 minutes was ordinary factory time and 1 hour and 30 minutes was overtime. For this the workman's pay will be automatically calculated for three hours of ordinary time because the spacing upon the combination time of day scale will be equivalent in the spacing upon the interpreting schedule to three hours of ordinary time.

It will be observed from Fig. 5 that the double time value table or schedule is also provided with the elapsed time scale indicated at 20, the intervals of this schedule corresponding in both position and spacing with the intervals of the time value scales of the schedule. By manipulating the ticket as explained the elapsed time between any two marked times of day can be readily determined.

In the ticket with the arrangement of ordinary time of day and overtime scales 10 and 11, shown in Fig. 3, the ticket markings are interpreted in substantially the same manner explained in connection with the ticket of Fig. 2. At 21 is shown a peculiar bracket form of marking which is sometimes employed for eliminating an idle portion of a day when the workman was without a job to perform or has been idle for lunch or other purposes, which are not chargeable. This form of marking may be used when the time of day scale gives all the working hours without the elimination of an idle noon hour. In manipulating the ticket with such a mark, it is a simple matter to deduct the idle portion of the day by the use of the pencil and shifting of the ticket, the pencil being first placed upon the guide 16 of the schedule in register with the finishing time of the first job, which is 5:30, the ticket being in initial position for calculation, then moving the ticket downwardly against the guide gage until the time of starting mark 7:30 registers with the pencil point; then with the ticket in this position moving the pencil to a point on the gage 16 in registry with the upper portion of the bracket mark 21, and with the pencil held in this position, shifting the ticket upwardly until the lower portion of the bracket mark 21 is in registry with the pencil point. The result will show that nine hours and 15 minutes were spent in the first job marked upon the ticket of Fig. 3.

Practically the same process is carried out for determining the elapsed time and its value marked partly on the ordinary time of day scale 10, and the parallel overtime scale 11 of Fig. 3. The ticket is placed upon the schedule in initial position and with the pencil upon the gage 16 opposite the lower 7 o'clock position of the ticket scale 10, the ticket is shifted downwardly until the time of starting of the second job namely 5:30, is in registry with the pencil point. The ticket is held in this shifted position and the pencil moved to a point upon the gage opposite the finishing time of said second job which is 8:30, marked upon the overtime scale 11, which point is easily located by the aid of the ordinary time of day scale at the edge of the ticket. With the pencil held in this second position the ticket is again moved downwardly until the 7 o'clock position on the overtime scale is in transverse registry with the pencil point. The result upon the time valve scale of the schedule will show that the equivalent of three hours and 45 minutes of ordinary time has been expended, whereas as a matter of fact only three hours has actually been put in, one hour and a half of which was overtime.

In Fig. 6 of the drawings I have shown a daily time check or ticket 25 having along its right hand longitudinal edge an ordinary time of day scale 26, giving the intervals of time from 8 o'clock in the morning until 5 o'clock in the afternoon and with the noon hour from 12 to 1 eliminated. This ticket also has across its upper edge three transverse columns of rate numerals 27, 28 and 29, showing hourly rates of time cost, and across the bottom edge of the ticket certain fractional rates 30 and 31, indicated as tenths and hundredths. The face of the ticket has spaces to receive the proper descriptive features, time and amount. The time of day scale in this form of ticket shows a 10 minute interval between the divisions of the scale and the hourly rates range from 10 to 51, making the ticket applicable to a great range of work. This style of ticket can be made of increased scope by altering its dimensions and it will of course be understood that the particular rates selected can be applied to the conditions in any factory where the time card and calculating system is to be used.

For interpreting the markings of this time ticket of Fig. 6, it is necessary to provide a plurality of time value tables or schedules. In Fig. 7 I have shown more or less diagrammatically, a form of table or schedule which has been practically used and conveniently answers the purpose for reading markings with this form of ticket. Referring to Fig. 7, it will be observed that I have represented a multiple value table or schedule, comprising three main sections I, II and III, mounted in parallel relation upon a frame 35. Each of these tables or schedules is formed with an upper series of value scales 33 and a lower series of value scales 34, the numerals of the several scales progressing upon different ratios and the separation between the numerals being arranged to correspond with the time interval of the time of day scale upon the ticket to be interpreted. The value scales are arranged in parallel vertical columns spaced equally apart laterally and the corresponding intervals of the several scales are in alinement transversely of the schedule. Each lower section 34 of the schedule is in vertical alinement with an upper schedule section 33, and the distance between corresponding time intervals of two sections 33 and 34 is equal to one time interval more than the length of the ticket so that when the ticket is placed upon one section of the table or schedule the corresponding parts of the upper and lower value scales will be exposed above and below the opposite edges of the ticket. The lower schedule sections 34 for use with the ticket shown in Fig. 6 are time value scales for interpreting the fractional rates indicated at the bottom of the time ticket. The several sections of the table or schedule are designed to give time values for the several transverse rows or series of hourly rates found at the top of the time ticket, with fractional additions found at the bottom of the ticket, the first section of the schedule giving value scales for the rates found in the first transverse row 27 of rates, that in the second section for the second row 28 and the third section for the third row 29.

Arranged upon the right of each schedule section is a gage rib or strip 16 having a longitudinal channel 16ᵃ adjacent to its inner edge, and at the top of each schedule section is a transverse gage rib 17, these gage ribs 16 and 17 being for the purpose of positioning and guiding a marked ticket upon the schedule while the ticket markings are being interpreted. Each schedule section is also provided with an elapsed time scale showing hours and fractions of hours upon the time measurement basis of the time of day scale shown on the ticket.

In interpreting the ticket markings of the ticket shown in Fig. 6 with a time value table or schedule, shown in Fig. 7, it will first be observed that the hourly rate of the particular workman who has performed the work and marked the ticket is given as 31½¢ per hour. The rate numeral 31 being in the second transverse column at the top of the ticket it must be understood that the ticket so marked must be interpreted by the second section of the composite time value schedule. The ticket is accordingly placed in this section II of the schedule and positioned with its time of day scale edge in contact with the guide rib 16 and its upper edge in contact with the transverse gage 17. With the pencil or other pointed instrument placed in the channel 16ᵃ of the gage rib 16, in registry with the marked finishing time of the first job (10:10) the ticket is moved downwardly until the marked starting time (8:30) comes in registry with the point of the pencil. The resulting value of the time spent at the rate given will be found in the value scales partly above and partly below the edges of the ticket in the columns in which the marked rate numerals 31 and 5 are found; since this ticket has in addition to the 31 cent rate marking at the top, a fractional rate marking at the bottom, namely five-tenths or one-half, making the rate 31½ cents per hour, so that in reading the ticket the operator has to observe the value in the scale 34 below the ticket marking 5 and add the same to the numbers found above the main rate marking at the top of the ticket. At the same time the elapsed time will be indicated above the edge of the ticket on the elapsed time scale. In the same way the value and amount of the time spent on the several jobs marked on the ticket can be quickly determined.

In Fig. 8 I have shown a further modification of the improved time ticket 39, having a divided time of day scale, one half of the scale being arranged upon each of the longitudinal edges of the ticket. This divided scale is made up of 5 minute intervals so that to include the whole day scale, it is arranged in sections. The morning half of the scale is shown at 40 and the afternoon half of the scale at 41. The usual identifying data have been omitted from this ticket. A series of rate numerals 42 is arranged across the top of the ticket. In interpreting the markings upon a ticket of the form shown in Fig. 8 I employ the time value table or schedule of a plurality of value scales computed on proper ratios and mount such schedule in the frame having longitudinal gages 16 at both sides and a transverse gage 17 at the top, as shown in Fig. 10, the two gages 16 being separated by exactly the width of the ticket to be used with this form of schedule. The scale numerals of this schedule have been omitted since it will be understood that they are of the same progressive forms as those above described.

In Fig. 9 I have shown the coupon form of ticket, each coupon of which, as indicated at 45 is provided with two parallel time of day scales at one edge, as shown at 46 and 47, and a transverse series of rate numerals across the top edge, as shown at 48. These coupon tickets are divided by perforated lines indicated at 49, which enable them to be readily separated so that they can be used for separate jobs and filed away as showing part of the cost of a particular job. The interpretation of the ticket markings is accomplished on a proper time value table or schedule upon the same principle as hereinbefore explained.

The vertical gage rib or flange 16 employed upon the time value table or schedule may be constructed in various forms. I have shown several modifications of this part of the mechanism in Figs. 11 to 17. In Figs. 11, 12 and 13, gage 16 is shown with a series of shallow recesses, x with which the point of the pencil or other instrument can be readily positioned. As indicated in Figs. 4 and 5 of the drawings, these shallow recesses are spaced to agree with the spacing of the time of day and time value scales of the ticket and schedule. These individual recesses are not essential, though they are an added convenience in accurately and quickly locating the position for the pencil in manipulating the ticket upon the schedule. In Figs. 14, 15, 16 and 17, the gage 16 is shown with a continuous channel y in its upper face adjacent to its gaging inner edge, and this channel in Fig. 17 is shown with a milled or roughened surface. The purpose of the channel is to assist in quickly locating the point of the pencil or other instrument upon the gage in registry with the desired ticket marking. This channeled form of gage 16 is also illustrated in Fig. 7 of the drawings.

In Figs. 11 and 14 the gage 16 is made with a plain gaging inner edge, while in Figs. 12 and 15 the gaging face is undercut as shown at z so as to provide an overhanging ledge of the gage under which the gaging edge of the ticket can be quickly placed and more readily moved up and down upon the schedule, the ledge of the gage serving to retain the gaging edge of the ticket in position during the manipulations.

The time tickets having weekly or monthly rates and the time value schedules corresponding with such tickets are useful for certain factory conditions in which the wages are reckoned on such basis. These forms of tickets and interpreting schedules usually require special preparation to suit the particular conditions in the factory for which they are designed since the range of rates and the interpreting value scales have to be based upon conditions as found, the number of hours required for the week or monthly calculation varying slightly in different cases. Such special forms of tickets are those shown in Figs. 1, 2 and 3 of the drawings.

The ticket shown in Fig. 6 of the drawings is of a form which may be said to be of universal application it being designed upon an hourly rate which is adopted in a great many factories and which can be made applicable to conditions in which a weekly or monthly rate is in vogue, by reducing said weekly or monthly rate to an hourly table which would be found to apply to the hourly rate ticket.

What I claim is:

1. The combination of two time value tables or schedules each comprising a plurality of progressive value numeral scales arranged in parallel column formation, and the columns of one table or schedule being in alinement with those of the other, with a time check or ticket having a time scale corresponding in spacing with the scale numerals of the schedules, and two series of rate indices arranged at opposite ends of said ticket, said rate indices being spaced to correspond with the column spacing of the schedules, the length of said time check or ticket being one time interval shorter than the distance between the zero positions of the two alined schedules.

2. The combination of two time value tables or schedules each comprising a plurality of progressive value numeral scales arranged in parallel column formation, and the columns of one table or schedule being in alinement with those of the other, with a time check or ticket having a time scale corresponding in spacing with the scale numerals of the schedule, and two series of rate indices arranged at opposite ends of said ticket, said rate indices being spaced with reference to an edge of the ticket to correspond with the column spacing of the schedules, corresponding parts of said schedules being separated by a space equal to the length of the ticket and the space of one time interval.

3. The combination of a time value table or schedule of spaced progressive value numerals having a gage rib formed with an instrument engaging recess or depression in its face mounted at one side of and parallel with said table or schedule, and a time check or ticket having a longitudinal time of day scale printed upon it adjacent to one of its side edges, the numerals of said time of day scale being spaced to correspond with the spacing of the value numerals of the schedule.

JOSEPH I. LINER.

Witnesses:
WM. A. COURTLAND,
ELSIE SWENSON.